June 5, 1962  V. A. FLETCHER  3,037,386
LIQUID LEVEL GAUGING APPARATUS
Filed Nov. 10, 1960  2 Sheets-Sheet 1
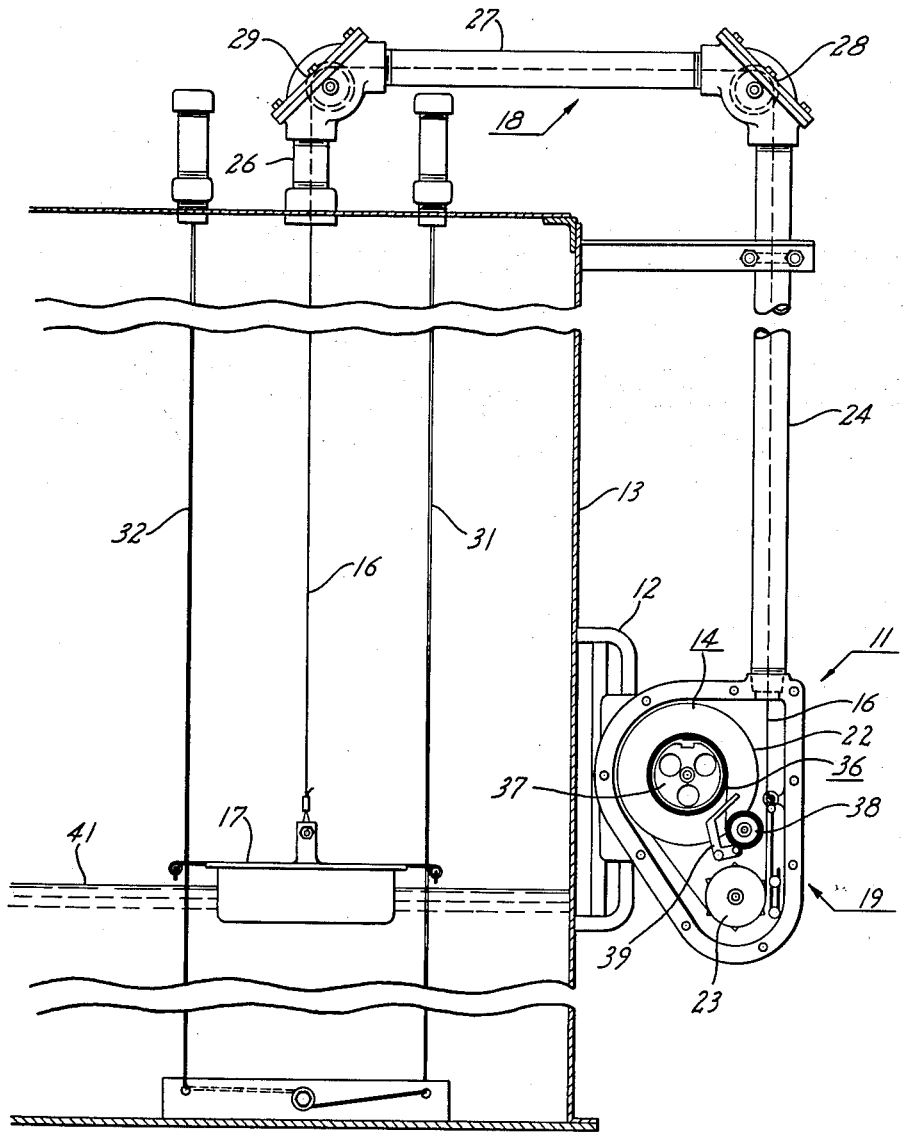
FIG_1_
INVENTOR.
Vernon A. Fletcher
BY
*Flehr & Swain*
ATTORNEYS June 5, 1962
V. A. FLETCHER
3,037,386
LIQUID LEVEL GAUGING APPARATUS
Filed Nov. 10, 1960
2 Sheets—Sheet 2
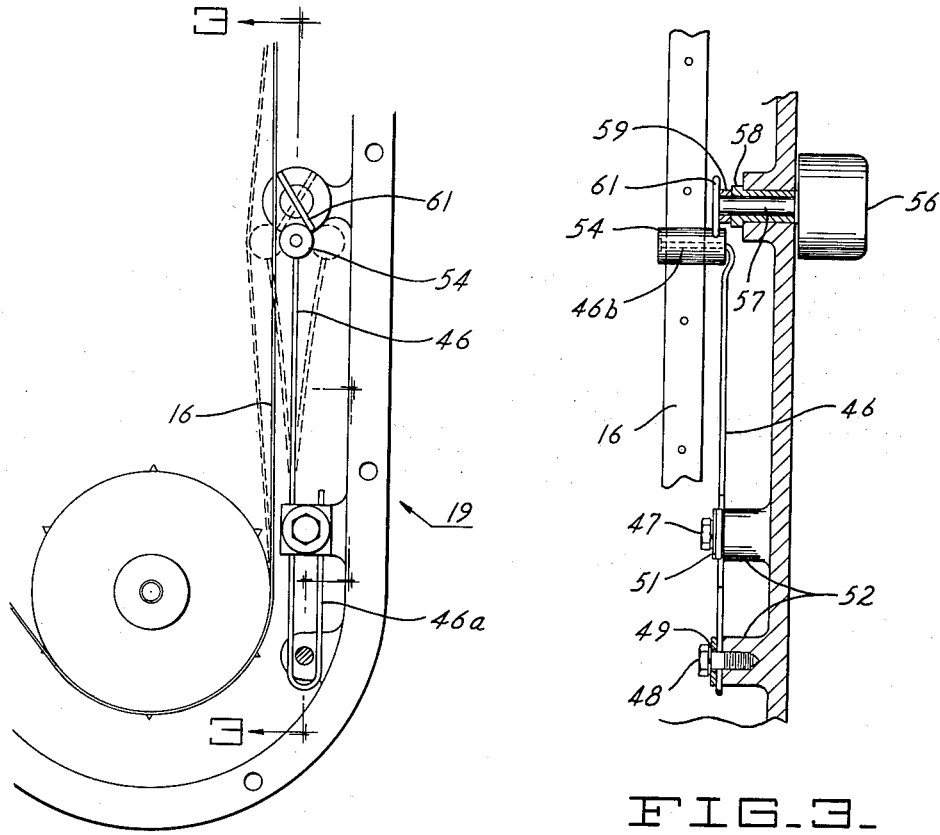
INVENTOR.
Vernon A. Fletcher.
BY
ATTORNEYS

United States Patent Office 3,037,386
Patented June 5, 1962

3,037,386
LIQUID LEVEL GAUGING APPARATUS
Vernon A. Fletcher, Oakland, Calif., assignor to Shand and Jurs Co., Berkeley, Calif., a corporation of California
Filed Nov. 10, 1960, Ser. No. 68,560
5 Claims. (Cl. 73—321)

This invention relates generally to level gauging apparatus and more particularly to liquid level gauging apparatus.

In copending applications Serial No. 705,203, filed December 26, 1957, and Serial No. 756,100, filed August 20, 1958 (now U.S. Patent No. 2,952,155, issued September 13, 1960), in the name of Karl H. Koehne there is disclosed gauging apparatus which includes means of various types of overcoming any friction which inhibits free movement of the gauging tape. As explained in those applications, this friction is overcome by introducing recurrent movements or vibrations in the tape.

The particular types of apparatus disclosed in the above applications have been found to be very satisfactory. However, there is still a need for apparatus of this type for introducing recurrent movements or vibrations in a gauging tape which does not require a source of electrical power and which is relatively inexpensive and easy to manufacture. There is also a need for such a device which can be supplied as a replacement for use on existing installations.

In general, it is an object of the present invention to provide an improved level gauging apparatus in which particularly novel means is utilized for overcoming any friction which tends to inhibit the free movement of the tape.

Another object of the invention is to provide level gauging apparatus of the above character which does not require a source of electrical power.

Another object of the invention is to provide a gauging apparatus of the above character which can be operated by hand to introduce strong recurrent relatively rapid vibrations into the tape.

Another object of the invention is to provide a gauging apparatus of the above character which is economical to manufacture and easy to install.

Another object of the invention is to provide means for introducing recurrent vibrations in the tape which can be supplied in kit form for modification of existing installations.

Additional objects and features of the invention will appear from the following description in which the preferred embodiment has been set forth in detail in conjunction with the accompanying drawings.

Referring to the drawings:

FIGURE 1 is a side elevational view partly in cross-section showing gauging apparatus incorporating the present invention with the cover for the gauging head removed;

FIGURE 2 is an enlarged view of a portion of the gauging head showing the means for introducing recurrent relatively rapid vibratory movements in the gauging tape, and FIGURE 3 is a cross sectional view taken along the line 3—3 of FIGURE 2.

In general, the present invention consists of a liquid level gauging apparatus in which particularly novel means is utilized for introducing recurrent movements into the gauging tape to overcome the effect of friction which tends to retard movement of the tape. The particular novel means includes a spring-like member having a weight at one end which is mounted in such a manner that the weight and the end of the spring-like member attached thereto is free to vibrate or oscillate back and forth in a pendulum-like manner into and out of engagement with the tape to introduce recurrent movements or vibrations in the gauging tape thereby overcoming the effect of friction tending to retard movement of the tape.

The gauging apparatus illustrated in FIGURE 1 of the drawing consists of a head assembly 11 mounted upon a bracket 12 and affixed to the side of the tank 13. The head assembly 11 includes reeling means 14 which engages a metal gauging tape 16 or like elongate flexible gauging element. The tape 16 is secured to a float 17 disposed within the tank 13. Guide means 18 serves to guide the tape 16 between the float and the reeling means 14. Motion inducing means 19 is mounted within the head assembly 11 for inducing recurrent movements in the tape to nullify the effect of friction upon movement of the tape introduced by the guide means 18 and the rotating parts of the head assembly 11.

The reeling means 14 includes a reel or tape drum 22 upon which the tape 16 is adapted to be reeled. The tape extends downwardly over a sprocket wheel 23 and then upwardly past the motion inducing means 19 through the guide means 18 and down into the tank where it is connected to the float 17.

The guide means 18 is similar to that described in copending applications Serial No. 705,203, filed December 23, 1957, and Serial No. 756,100, filed August 20, 1958 (now U.S. Patent No. 2,952,155, issued September 13, 1960). As disclosed therein, it consists of a pair of vertical runs 24 and 26 and a horizontal run 27. The guide means also includes direction changing means consisting of sheave assemblies 28 and 29 which engage the tape. The float 17 is guided in its vertical movement by guide wires 31 and 32.

The head assembly 11 also includes counterbalancing means in the form of a negative spring assembly 36 which includes a power drum 37 connected to the reel 22 and a storage drum 38. The negative spring is sold under the trademark "Neg'ator spring." A guide member 39 serves to guide the path of movement of the negative spring from the storage drum 38 to the power drum 37. As is well known to those skilled in the art, the negative spring is a prestressed coil component which has a tendency to wind itself onto the storage drum 38 and as a result provides a slightly varying torque on the power or motor drum 37 to provide counterbalancing for the float 17 and tape system. The torque output of the Neg'ator motor has a slight variation designed to compensate for the length of the tape 16 which has been unreeled from the reel 22.

The operation of the head assembly 11 in connection with the change of liquid level such as a change to the level 41 shown in the tank 13 is well known to those skilled in the art and will not be described in detail. However, as pointed out in the above copending applications, any friction encountered in the direction changing assemblies 27 and 28 and in the head assembly 11 as well as any frictional engagement of the tape with the pipe sections in the guide means 18 tends to retard movement of the tape 16 and the float 17 upon a change in liquid level in the tank 13. This is true because before any change in the position of the tape 16 can occur, the force created by the float must be sufficient to overcome the friction imparted by these elements. Thus, it is apparent that to overcome this friction, the level in the tank must change sufficiently to exert a force on the float to overcome the friction before any change in the positioning of the gauging tape 16 can occur. Therefore, the gauging tape 16 does not reveal the true level of the liquid in the tank 13 because of the friction in the guide means and the head assembly which prevents the float 17 from seeking its true position.

The motion inducing means 19 for overcoming or nullifying the effects of such friction is shown in detail in FIGURES 2 and 3. The motion inducing means 19 consists of a spring member 46 formed of suitable springy material such as type 302 stainless steel. The member 46 can be in any suitable form such as the cylindrical rod shown. One end of the member 46 is provided with a U-shaped portion 46a which is fixed to the housing of the head assembly by a pair of cap screws 47 and 48 engaging lock washers 49 and retaining clip assemblies 51. The capscrews are threaded into raised portions 52 of the housing. The other end of the spring member 46 is free and is provided with an L-shaped portion 46b which carries a weight 54 rotatably mounted thereon.

The spring member 46 and the weight 54 form a pendulum-like device. The position of the weight 54 and the free end of the spring 46 is adapted to be adjusted by the capscrews 47 and 48. It is normally adjusted so that the weight 54 is spaced a predetermined distance from the gauging tape 16 as for example 1/32 of an inch. The spring member 46 has sufficient rigidity so that the weight 54 is maintained in a vertical position and returns to the same vertical position after vibratory movement as hereinafter described.

The weight 54 is arranged so that its axis lies in a plane which is parallel to the plane of the tape. The spring member 46 is mounted in such a manner that when the vibratory motion is imparted to the spring member as hereinafter described, the spring member will oscillate or vibrate back and forth in a plane which is perpendicular to the plane of the tape.

Manual means is provided for operating the spring member 46 and consists of an operating knob 56 mounted on a shaft 57 rotatably mounted in a bearing 58 provided in the housing of the head assembly. A retainer ring 59 is provided on the shaft 57 to hold the shaft in place. An actuating member 61 is carried by the shaft 57 and is of a length that it can be moved into engagement with the weight 54 as is shown particularly in FIGURE 2 to cause movement of the weight 54 and the free end of the spring member 46 out of their normal positions away from or toward the tape 16 until the weight 54 has been moved to a position in which it slips past and is released by the actuating member 61.

Operation of the apparatus may now be briefly described as follows: Let it be assumed that it is desired to take a reading of the liquid level in the tank 13. Before taking the reading, the motion inducing means is actuated by rotating the knob 56 sufficiently so as to move the weight and the free end of the spring arm 46 toward or away from the tape until it slips by the actuating member 61. As soon as the weight is released, it vibrates or oscillates back and forth in a pendulum-like fashion and into and out of engagement with the tape as shown particularly in FIGURE 2 to thereby introduce relatively rapid recurrent movements or vibrations in the tape. These movements or vibrations are transmitted along the length of the tape in both directions from the point of contact with the weight 54. These movements or vibrations are very similar to those described in copending applications Serial No. 705,203, filed on December 26, 1957, and Serial No. 756,100, filed on August 20, 1958. As explained in those applications, these recurrent movements or vibrations in the tape cause the float 17 to seek its true position in the tank to thereby cause proper positioning of the tape 16 so that a correct read-out is obtained even though considerable friction may be present in the guide means 18 for the tape and the rotating elements in the head assembly 11. This has been found to be true because the vibrating tape 16 actually rises or jumps off of the supporting surfaces of the sheave assemblies 27 and 28 and, therefore, any friction which tends to prevent rotation of the sheaves does not affect the proper positioning of the tape. The motion of the tape, however, is not so severe that the tape can at any time clear the guide flanges of the sheaves. The same is true with respect to the rotating parts in the head assembly 11 and with respect to any frictional engagement of the tape with the pipes forming the guide means 18. The vibrations introduced into the tape in this manner by the mechanical vibration of the spring element 46 occurs for a sufficient length of time to permit the float 17 to seek its true position.

The motion of the spring arm 46 and the weight 54 will be damped by the spring member or arm itself and by the friction from the air so that eventually the weight 54 no longer engages the tape and finally seeks its normal vertical position as shown in solid lines in FIGURE 2. In the same manner, as soon as the weight 54 no longer engages the tape, the vibrations in the tape 16 will damp out very rapidly so that reading of the tape or tape actuated readout can be accomplished within a short time after the motion inducing means 19 is operated.

When the weight 54 seeks its normal position with the spring member 46 in a vertical position, the weight 54 is out of engagement with the tape 16 and therefore does not interfere with the proper positioning of the tape. It is readily apparent that the frequency of the movements or vibrations introduced into the tape can be readily changed by shortening or lengthening the spring member 46 or by changing the section modulus of the spring member 46. The amplitude of the vibrations of recurrent movements can also be increased or decreased merely by changing the size of the weight 54.

By way of example, in one embodiment of our invention, the free portion of the spring-like element 46 has a length of 4.5 inches above the top projection 52 of the housing. The spring member 46 had a diameter of .177 inch and carried a weight 54 which weighed 1 ounce. When this motion inducing means was operated, it was found that it caused recurrent movements, or vibrations were introduced into the tape 16, at the rate of approximately 45 cycles per second.

This motion inducing means has been found to be particularly satisfactory in many applications because no source of electrical power is required. It is relatively simple to manufacture and easy to maintain. It is constructed in such a manner that it can be supplied in kit-form for modification of existing liquid level gauges. It is also constructed in such a manner that it can be readily adjusted by the man in the field.

I claim:

1. In a liquid level gauging apparatus, a movable elongated flexible element adapted to be positioned in accordance with the liquid level, guide means engaging the element and guiding the same, said guide means being characterized by introducing friction tending to retard the movement of said element, a spring member, a weight carried on one end of said spring member, means for securing the other end of said spring member so that the weight on said one end of said spring member is positioned adjacent the element, said weight and said one end of said spring member being free and being adapted to swing into and out of engagement with the element in pendulum-like fashion, means for moving said weight and said spring element from their normal positions and then releasing the same to impart vibratory motion to the weight and said one end of the element to thereby cause the same to recurrently strike the elongate element to introduce therein recurrent movements or vibrations to cause said element to seek the position it would assume if no friction was present in the guide means.

2. A liquid level gauging apparatus as in claim 1 wherein said means adapted to move said weight and said one end of said spring member out of their normal positions includes a knob, and a member rotatable by said knob, said last-named member being adapted to be moved into engagement with said weight.

3. A liquid level gauging apparatus as in claim 1 wherein said spring member extends in a direction substantially parallel to the portion of the tape which the spring member is adjacent and wherein said weight is secured to said spring member and lies in a position substantially perpendicular to the longitudinal axis of the portion of the tape which the spring member is adjacent.

4. A liquid level gauging apparatus as in claim 1 together with means for adjusting the position of said one end of said spring member and said weight carried thereby.

5. In a liquid level gauging apparatus, a movable elongate flexible element adapted to be positioned in accordance with the liquid level, guide means engaging the element and guiding the same, said guide means being characterized by introducing friction tending to retard movement of said element, a vertical spring member, a weight carried by one end of said spring member and lying in a horizontal plane, means for securing the other end of said spring member so that the weight is positioned adjacent the element and lies in a plane parallel to the plane of the tape, said spring member being normally in a vertical position, and means for moving said one end of said spring member and said weight away from their normal positions and for releasing the same to thereby induce pendulum-like vibratory motion in the same to cause the same to recurrently strike the elongate element to thereby introduce therein recurrent movements or vibrations.

No references cited.